(12) United States Patent
Kuehl et al.

(10) Patent No.: US 9,821,420 B2
(45) Date of Patent: Nov. 21, 2017

(54) METHOD OF FORMING A REFRIGERATION HEAT EXCHANGER

(71) Applicant: Whirlpool Corporation, Benton Harbor, MI (US)

(72) Inventors: Steven J. Kuehl, Stevensville, MI (US); Guolian Wu, Saint Joseph, MI (US); Glenn Daehn, Columbus, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 407 days.

(21) Appl. No.: 14/591,980

(22) Filed: Jan. 8, 2015

(65) Prior Publication Data

US 2015/0198381 A1 Jul. 16, 2015

Related U.S. Application Data

(60) Provisional application No. 61/928,121, filed on Jan. 16, 2014.

(51) Int. Cl.
| | |
|---|---|
| *B23P 15/26* | (2006.01) |
| *F25B 40/06* | (2006.01) |
| *F25B 41/06* | (2006.01) |
| *F28F 13/08* | (2006.01) |
| *F28D 7/00* | (2006.01) |
| *F28F 1/00* | (2006.01) |

(Continued)

(52) U.S. Cl.
CPC .............. *B23P 15/26* (2013.01); *F25B 40/06* (2013.01); *F25B 41/067* (2013.01); *F28D 7/0008* (2013.01); *F28F 1/006* (2013.01); *F28F 1/06* (2013.01); *F28F 13/08* (2013.01); *F28D 2021/0068* (2013.01); *F28F 2275/00* (2013.01); *Y10T 29/49359* (2015.01)

(58) Field of Classification Search
CPC ..... B21D 39/042; B21D 39/048; B23P 15/26; B25B 40/06; B25B 41/067; F28D 2021/0068; F28D 7/0008; F28F 1/006; F28F 1/06; F28F 13/08; F28F 2275/00
USPC ...................................................... 29/890.035
See application file for complete search history.

(56) References Cited

U.S. PATENT DOCUMENTS

| 1,890,784 A * | 12/1932 | Jacobus | ............ F22G 7/14 |
| | | | 122/367.1 |
| 2,687,626 A * | 8/1954 | Bartlowe | ............ F25B 41/003 |
| | | | 138/38 |

(Continued)

FOREIGN PATENT DOCUMENTS

| DE | WO 2010054993 A1 * | 5/2010 | ......... F25B 41/067 |
| EP | 0167978 A2 | 1/1986 | |

(Continued)

OTHER PUBLICATIONS

English Translation of JP2002243286.*

(Continued)

*Primary Examiner* — Jacob Cigna

(57) ABSTRACT

A method of forming a refrigeration heat exchanger comprising a suction line and a capillary line includes juxtaposing at least a portion of the suction and capillary lines to form a juxtaposed portion, at least partially enveloping the juxtaposed portion with a metal material, and encapsulating the capillary line to the suction line along at least a portion of the juxtaposed portion.

16 Claims, 8 Drawing Sheets

(51) Int. Cl.
*F28F 1/06* (2006.01)
*F28D 21/00* (2006.01)

(56) References Cited

U.S. PATENT DOCUMENTS

| | | | |
|---|---|---|---|
| 4,147,037 A | 4/1979 | Gelbard et al. | |
| 6,688,423 B1* | 2/2004 | Beatty | B62D 5/062 |
| | | | 138/26 |
| 7,861,553 B2* | 1/2011 | Ryoo | F25B 40/06 |
| | | | 62/513 |
| 8,365,551 B2 | 2/2013 | Hanley et al. | |
| 8,567,485 B2* | 10/2013 | Viklund | F25B 40/06 |
| | | | 165/142 |
| 2007/0215333 A1* | 9/2007 | Viklund | F25B 40/06 |
| | | | 165/172 |
| 2011/0259040 A1* | 10/2011 | Cataldo | F16L 11/15 |
| | | | 62/498 |
| 2013/0086961 A1* | 4/2013 | Yablochnikov | B23K 20/06 |
| | | | 72/56 |

FOREIGN PATENT DOCUMENTS

| | | | | |
|---|---|---|---|---|
| JP | 2002243286 A | * | 8/2002 | ........... F28D 7/0008 |
| JP | 2002372316 A | * | 12/2002 | |
| JP | 2003050065 A | * | 2/2003 | ........... F28D 7/0016 |
| JP | 2004332943 A | * | 11/2004 | ........... F28D 7/0016 |
| JP | 2008267757 A | * | 11/2008 | ........... F28D 7/0016 |
| KR | 20090038295 A | * | 4/2009 | |
| WO | 2010054993 A1 | | 5/2010 | |
| WO | 2012043804 A1 | | 4/2012 | |

OTHER PUBLICATIONS

English Translation of JP2002372316.*
English Translation of JP2004332943.*
English Translation of JP2008267757.*
English Translation of KR20090038295.*
English Translation of WO2010054993.*

* cited by examiner

METHOD OF FORMING A REFRIGERATION HEAT EXCHANGER

CROSS-REFERENCE TO RELATED APPLICATION

This application claims priority to and the benefit of U.S. Provisional Patent Application Ser. No. 61/928,121, filed on Jan. 16, 2014, the entire disclosure of which is hereby incorporated by reference.

BACKGROUND OF THE INVENTION

Refrigeration systems may utilize a compressor, an evaporator, a condenser, and an expansion device, in a closed system. Fluid conduits may fluidly couple the components, such as a conduit coupling the compressor with the condenser, a suction line coupling the evaporator with the compressor, and a capillary line coupling the condenser with the evaporator. The expansion device, also known as an expansion valve, may be fluidly coupled into the line between the condenser and the evaporator. The functionality of the expansion device may be supplied by the capillary line.

At least a portion of the suction line may be placed in contact with the capillary line for heat exchange between the two lines. The capillary line may be installed inside the suction line, or along the suction line outer surface. With either installation, a silver soldering process may be employed to either seal the openings through which the capillary line enters the suction line, or to "weld" the capillary line to the suction line outer surface. The silver soldering process may be time-consuming and costly, and may necessitate highly skilled workers.

BRIEF DESCRIPTION OF THE INVENTION

Portions of a suction line and a capillary line in a refrigeration heat exchanger may form a juxtaposed portion at least partially enveloped by a metal material. The metal material may be moved at a speed great enough to flow plastically about, and encapsulate, the capillary line and the suction line.

DESCRIPTION OF AN EMBODIMENT OF THE INVENTION

Figure 1:
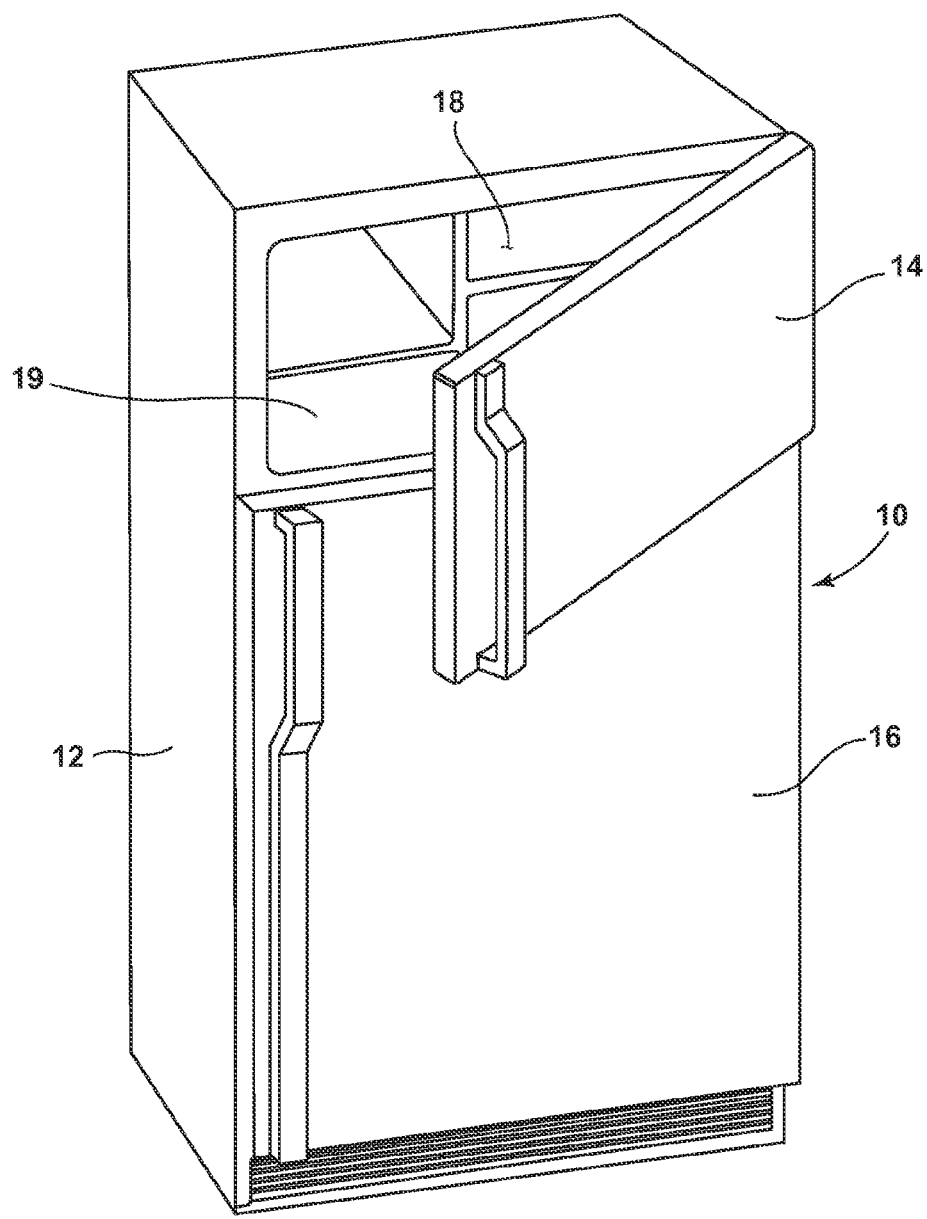
FIG. 1 is a perspective view of a refrigeration apparatus incorporating a refrigeration system according to an exemplary embodiment of the invention.

Referring now to the drawings, and in particular to FIG. 1, a refrigeration apparatus 10 may comprise a cabinet 12 characterized by an upper interior compartment 18, such as a freezer compartment, closeable by a freezer door 14. The refrigeration apparatus 10 may also be characterized by a lower interior compartment (not shown), such as a refrigerator compartment, closeable by a refrigerator door 16. The upper interior compartment 18 and the lower interior compartment may be cooled to different temperatures by operation of a refrigeration system. The compartment temperature differential may be maintained through separation of the compartments by an intervening insulated partition 19. The number and arrangement of refrigerated compartments, either a chilled compartment or a freezing compartment, are not germane to the invention, and are shown to illustrate one possible environment.

Figure 2:
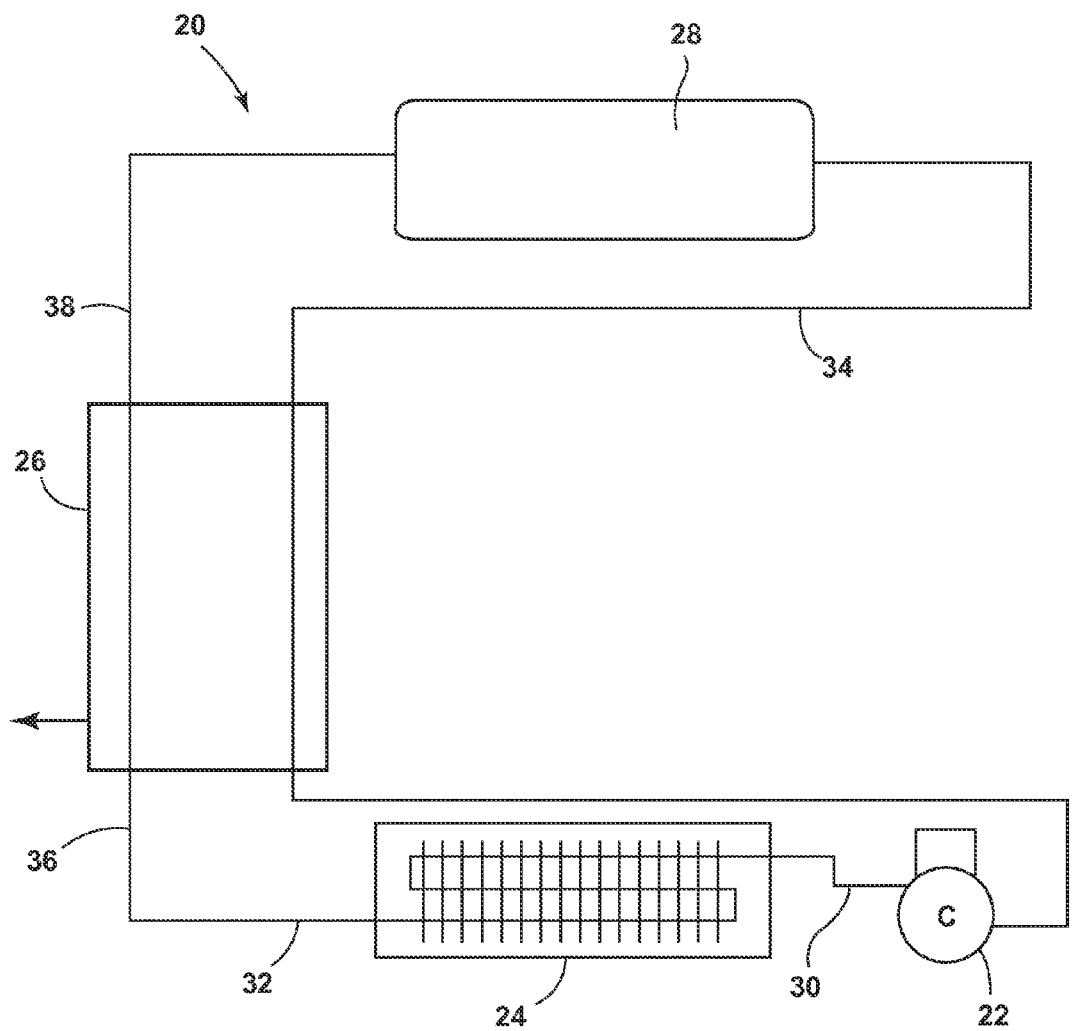
FIG. 2 is a schematic representation of the refrigeration system.

Referring to FIG. 2, a closed refrigeration system 20 may comprise a compressor 22, a condenser 24, an evaporator 28, and a heat exchanger 26. The compressor 22 and condenser 24 may be fluidly coupled through a high pressure vapor line 30. The condenser 24 and evaporator 28 may be fluidly coupled through a high pressure liquid line 32, a high pressure liquid capillary tube 36, and a low pressure liquid/vapor capillary tube 38. The evaporator 28 and the compressor 22 may be fluidly coupled through a low-pressure liquid/vapor suction line 34.

The capillary tube 36, 38 and the suction line 34 may pass through the heat exchanger 26. Within the heat exchanger 26, the capillary tube 36, 38 and suction line 34 may be in thermal juxtaposition. Heat energy may be transferred from the low-pressure liquid/vapor in the suction line 34 to the capillary tube 36, 38 along the juxtaposed portions, thereby contributing to the refrigeration system efficiency by optimal conversion of the high-pressure liquid to the low-pressure vapor. The capillary tube 36, 38 may be joined to the suction line 34 through a high velocity metal forming (HVMF) process.

High-velocity metal forming (HVMF) may move metal at a speed at which the metal plastically flows. For most metals, impact speeds greater than about 100 meters/second (m/s) may result in plastic flow. Impact even at much lower speeds (such as 60 m/s) m produce desirable plastic flow of the metals to be formed.

Figure 3A:
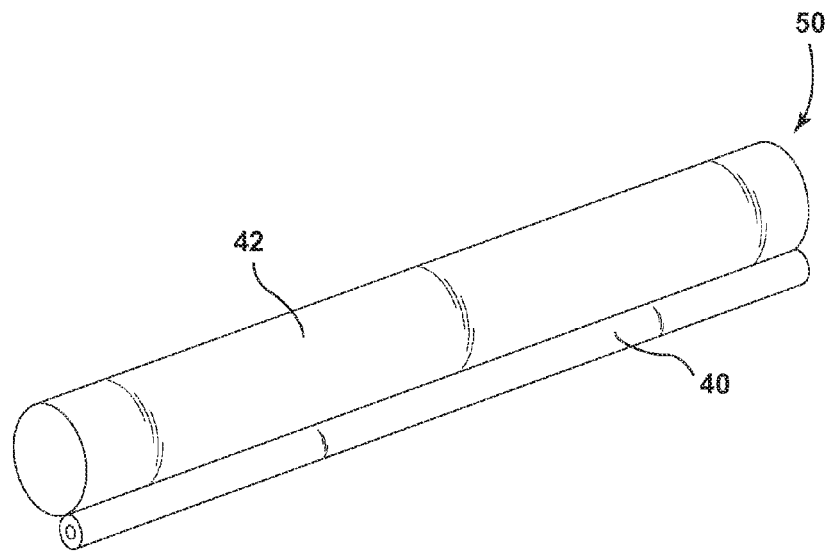
FIGS. 3A-C are perspective views of the fabrication of a first exemplary embodiment of a refrigeration tube assembly according to the invention.

Referring now to FIG. 3A, a first exemplary embodiment of a refrigeration tube assembly 50 may be characterized by longitudinally juxtaposed portions of a capillary tube 40 and a suction line 42, in which a portion of the capillary tube 40 may be in longitudinal contact with a portion of the exterior surface of the suction line 42. The exemplary embodiments described herein may include a capillary tube that may be fabricated of a non-metal material, such as a plastic, a resin, and the like. The exemplary embodiments described herein may include a suction line that may be fabricated of a metal material, such as copper, aluminum, and the like. Alternatively, the capillary tube may be fabricated of a metal material, and the suction line may be fabricated of a plastic, or both the capillary tube and the suction line may be fabricated of plastic or a metal material.

Figure 3B:
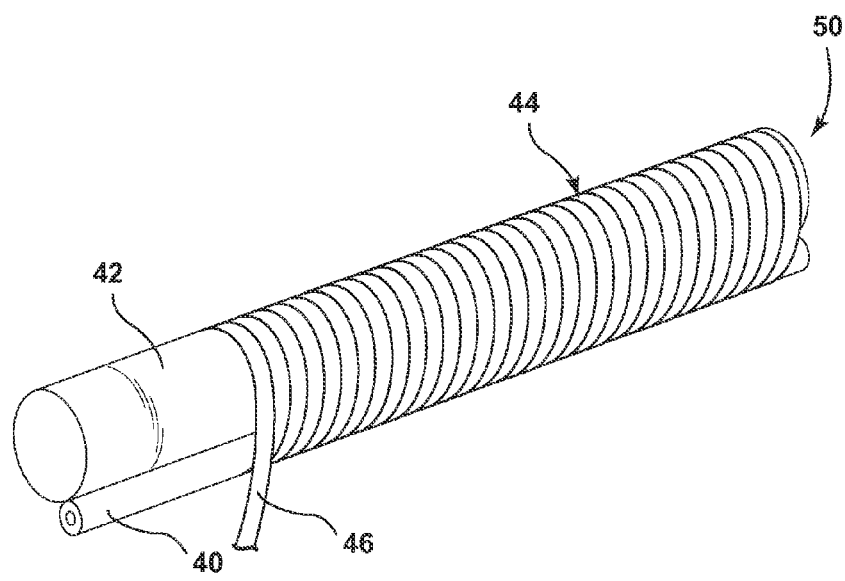

FIG. 3B illustrates a portion of the juxtaposed capillary tube 40 and suction line 42 receiving a metal wrapping 44 which may comprise a metal ribbon 46. The metal wrapping 44 may hold the capillary tube 40 against the suction line 42 in a selected configuration.

Figure 3C:
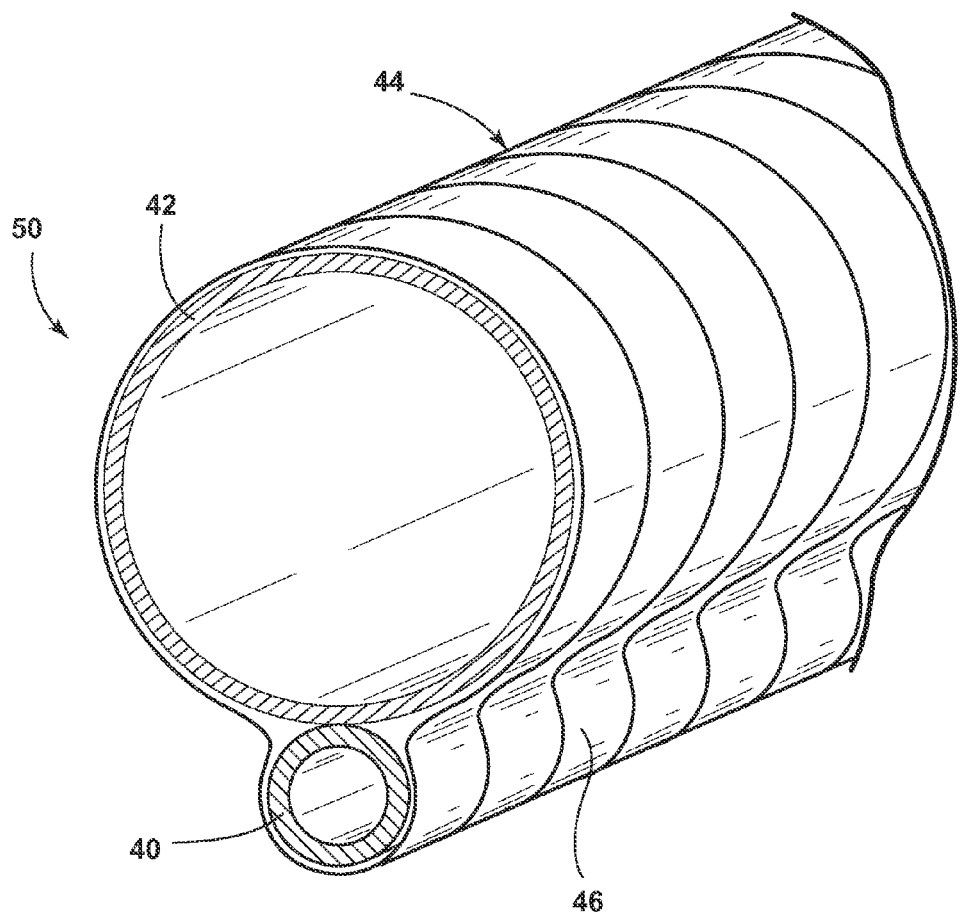

FIG. 3C illustrates a portion of the finished refrigeration tube assembly 50 after subjecting the tube assembly to an HVMF process. The process may use a helical coil that surrounds the outermost metal wrap. A high voltage discharge of high current through the coil with a sufficiently high frequency may deform the wrap onto the tubes due to the Lorentz repulsion between the coil and the wrap. The HVMF process may move the metal wrapping 44 at a speed great enough so that at least a portion of the metal wrapping 44 flows plastically about the capillary tube 40 and the suction line 42.

Figure 4A:
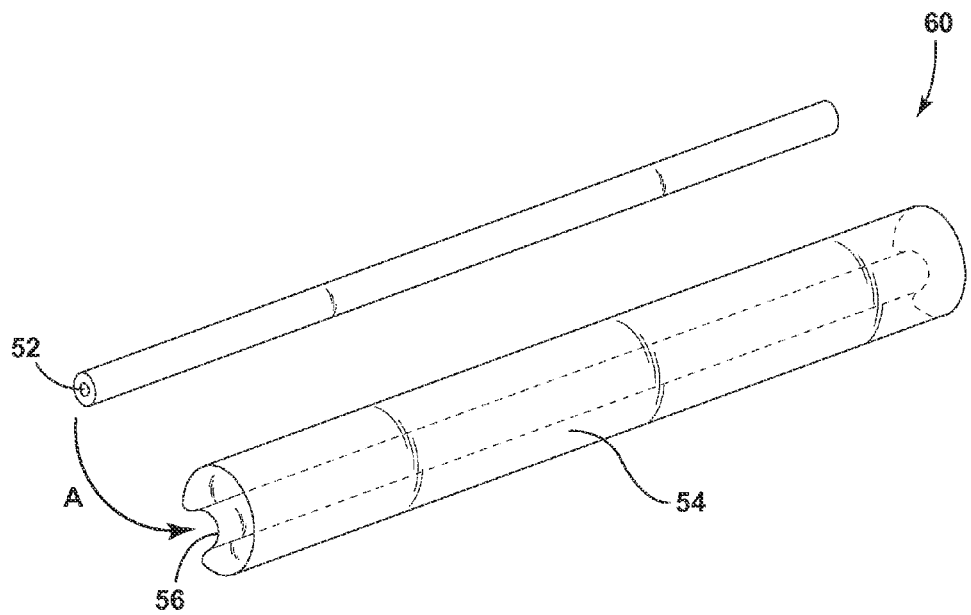
FIGS. 4A-C are perspective views of the fabrication of a second exemplary embodiment of a refrigeration tube assembly according to the invention.
Figure 4B:
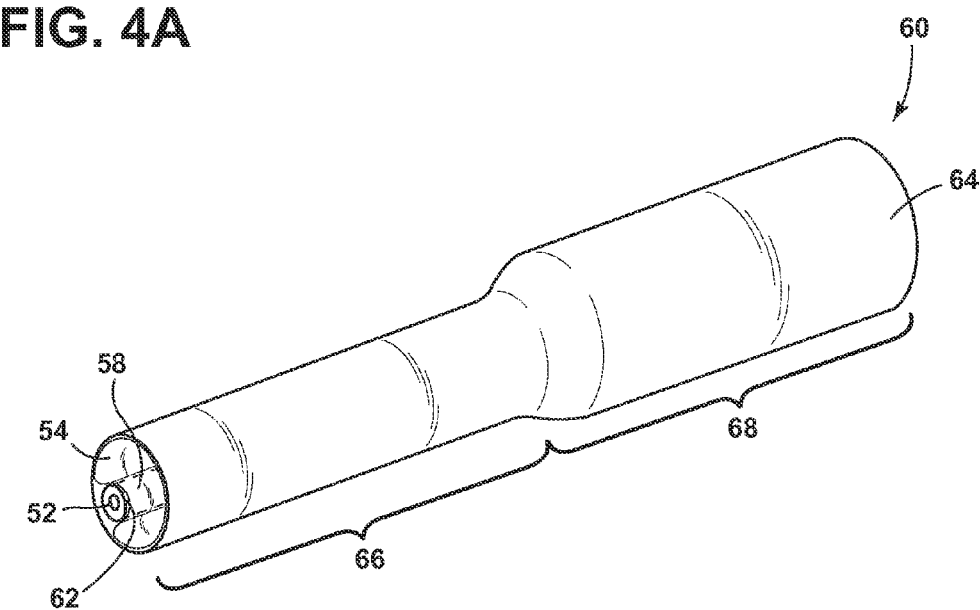

Referring now to FIG. 4A, a second exemplary embodiment of a refrigeration tube assembly 60 may be characterized by longitudinally juxtaposed portions of a capillary tube 52 and a suction line 54, in which a longitudinal capillary tube groove 56 may be formed in a suitable manner to define a capillary tube seat 58 along a portion of the exterior of the suction line 54. A portion of the capillary tube 52 may be at least partially seated in the capillary tube groove 56, represented by arrow "A," in contact with the capillary tube seat 58 to facilitate holding the portion of the capillary tube 52 against a portion of the suction line 54 in a selected configuration (FIG. 4B).

The portions of the juxtaposed capillary tube 52 and suction line 54 may be enclosed by a metal sleeve 64. FIG. 4B illustrates the metal sleeve 64 characterized by a post-formation assembly portion 66 and a pre-formation assembly portion 68. The post-formation assembly portion 66 may exemplify the refrigeration tube assembly 60 after application of a high-intensity electromagnetic force. The pre-formation assembly portion 68 may exemplify the refrigeration tube assembly 60 before application of a high-intensity electromagnetic force. Additionally, the assembly 60 may be formed in like manner without the pre-formed capillary tube groove 56. Alternatively, electromagnetic swaging may be employed to enclose the capillary tube 52 and suction line 54 by the metal sleeve 64 without pre-forming as described above and shown in FIG. 4A.

Figure 4C:
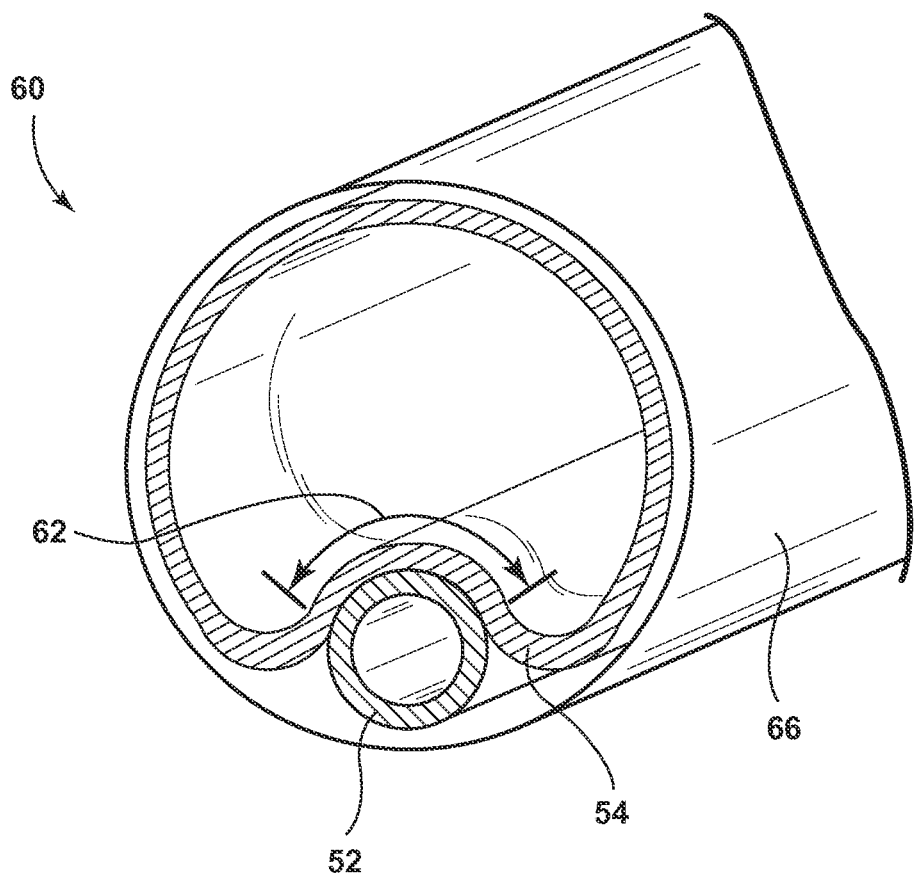

FIG. 4C illustrates the finished refrigeration tube assembly 60, in which a portion of the suction line 54 may be deformed with a portion of the capillary tube 52 "embedded" therein or conjoined therewith. The capillary tube groove 56 may be deformed against the capillary tube 52 to define an arcuate contact surface 62, which may provide a larger contact area for thermal energy transfer. The HVMF process may move the metal sleeve 64 at a speed great enough so that at least a portion of the metal sleeve 64 may flow plastically about the capillary tube 52 and the suction line 54.

Figure 5:
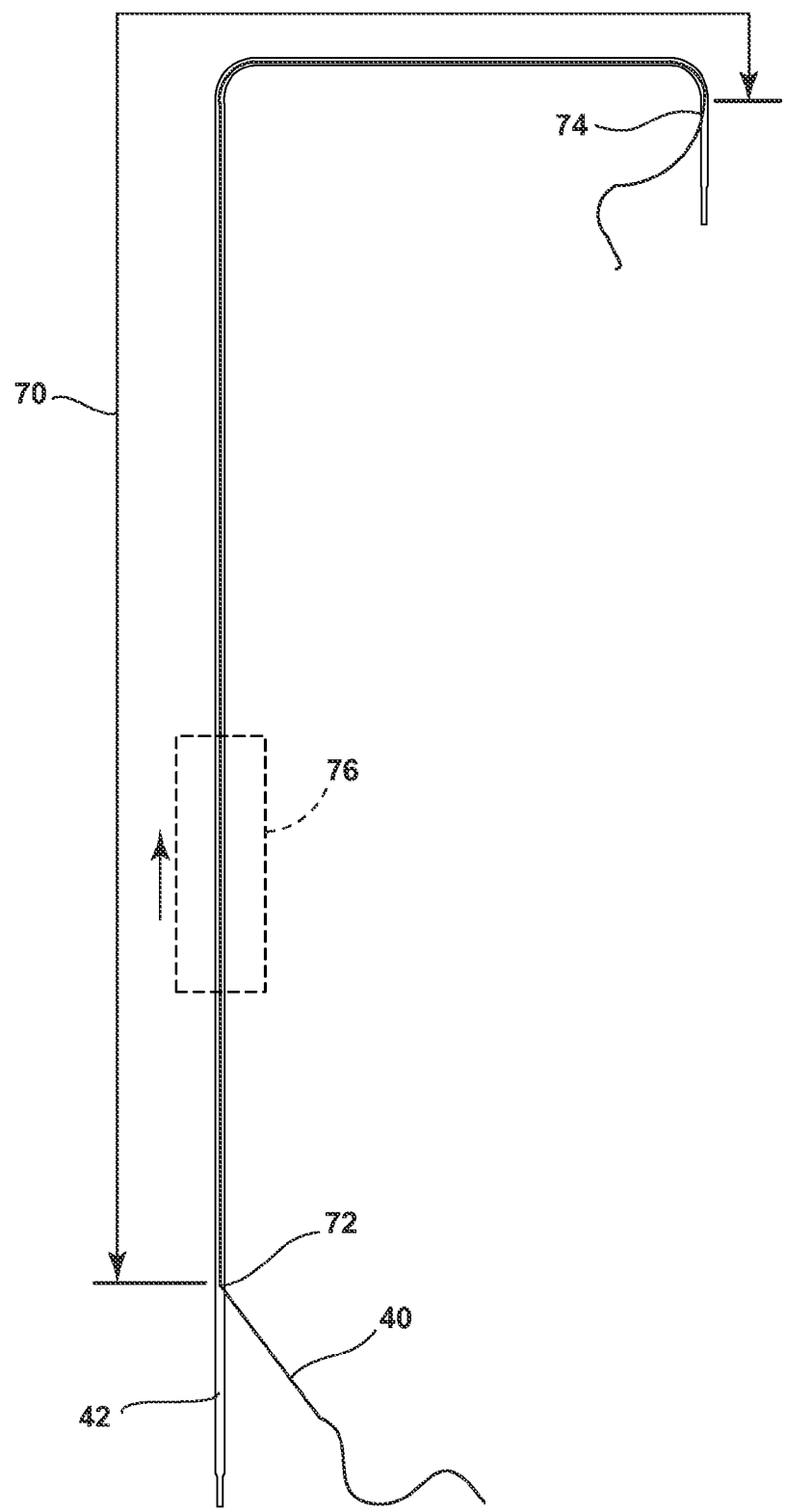
FIG. 5 is a schematic representation of a first exemplary embodiment of a high velocity metal fabrication apparatus for fabricating a refrigeration tube assembly according to the invention.

FIG. 5 illustrates schematically the capillary tube 40 and suction line 42 along a juxtaposed portion 70 that may be defined by a starting juxtaposition point 72 and an ending juxtaposition point 74. Beyond the juxtaposition points 72, 74 the capillary tube 40 and suction line 42 may be separated for fluid coupling with different components of the refrigeration system 20.

Figure 6:
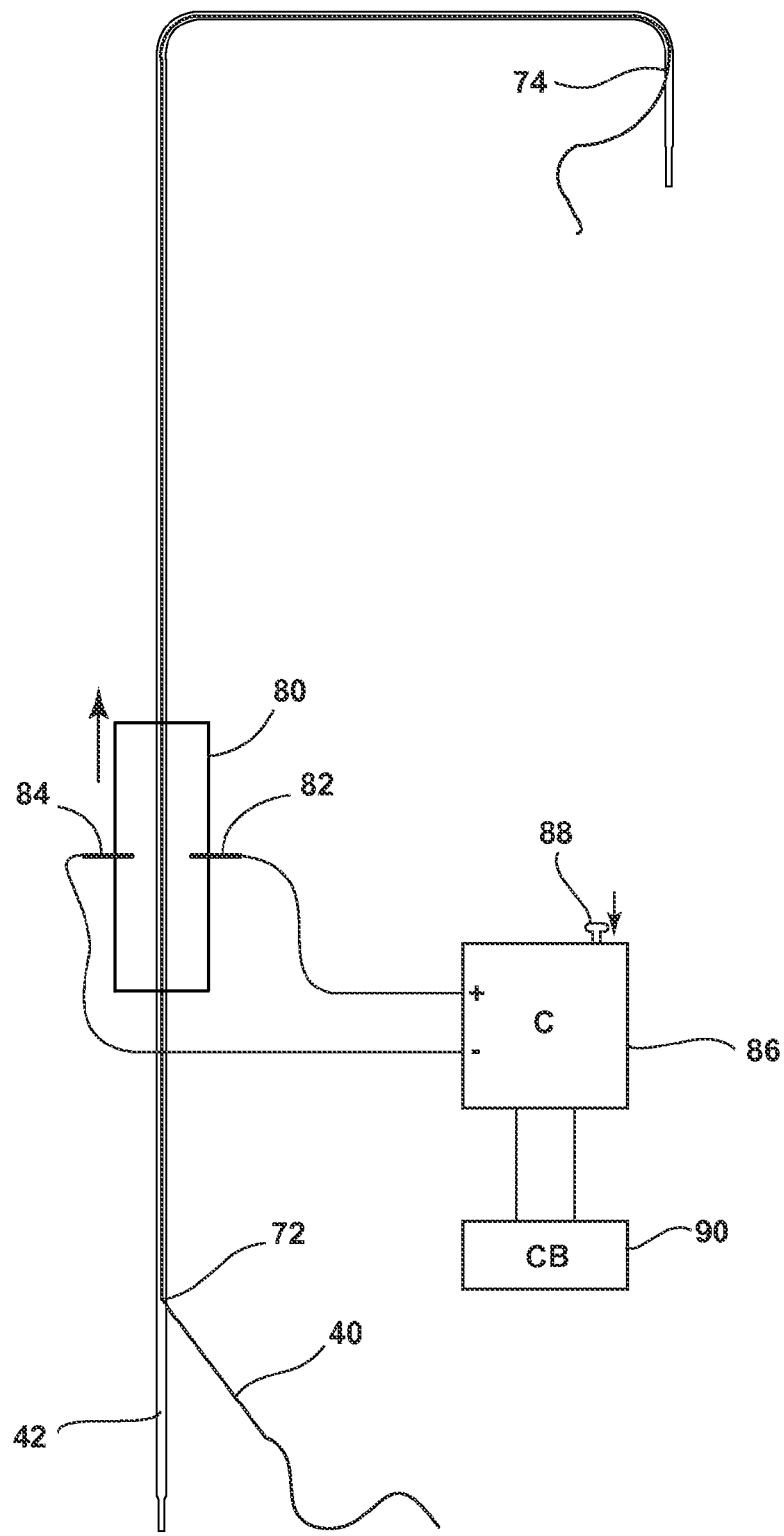
FIG. 6 is a schematic representation of a second exemplary embodiment of a high velocity metal fabrication apparatus for fabricating a refrigeration tube assembly according to the invention.

An electromagnetic force generator 76 may be configured to surround at least a part of the juxtaposed portion 70 for producing the refrigeration tube assemblies illustrated in FIGS. 3C and 4C. The force generator 76 may be essentially a helical high-strength conductive path, or electromagnetic coil, through which the juxtaposed portion 70 may be coaxially inserted. The force generator 76 may be electrically coupled with a high-voltage capacitor bank 90 (FIG. 6). The passage of a high-amperage, brief duration pulse, as created by the capacitor bank 90 discharge, may provide an inwardly-directed force. The force generator 76 may be stationary, with the juxtaposed portion 70 moving through the electromagnetic force field, or may be mobile, moving along the juxtaposed portion 70. In either configuration, the force generator 76 may produce an electromagnetic force field that may surround the juxtaposed portion 70 and generate forces directed radially inwardly.

Alternatively, an explosive wave process may "peen" the capillary tube 52 into the capillary tube groove 56 and define the capillary tube seat 58 to facilitate conductive bonding between the capillary tube 52 and the suction line 54. High-pressure "pulse" waves may be generated by triggering a controlled explosion in a chamber adapted for containing the explosion and directing the pressure waves against the workpiece. The controlled explosion may be triggered by elongate electrodes extending into the chamber. Sacrificial foils or other suitable materials may be coupled with the electrodes for instantaneous ignition. A high-voltage instantaneous release of electric current may be introduced across the electrodes to initiate an explosion.

Relative movement between the electromagnetic force generator 76 and the juxtaposed portion 70 may be continuous, with continuous generation of the electromagnetic force field, or incremental, with generation of a first electromagnetic force field at a first preselected location along the juxtaposed portion 70, followed by alignment of the electromagnetic force generator 76 with a second preselected location, and generation of a second electromagnetic force field at the second predetermined location. The process may be continued until the entire juxtaposed portion 70 has been exposed to the electromagnetic force field The incremental process may be particularly suitable for metal forming by application of radially inwardly-directed electromagnetic forces. Referring to FIG. 6, the configuration of the juxtaposed capillary tube 40 and suction line 42 may be generally as illustrated in FIG. 5. Electromagnetic forces may be generated by passage of a high-amperage, brief duration pulse, such as created by a capacitor bank discharge within an HVMF chamber 80, as hereinbefore described. The chamber 80 may be characterized by a somewhat tubular shape, and may be stationary or mobile. In either configuration, electromagnetic forces may be produced that may move radially-inwardly and surround the juxtaposed portion 70.

A plurality of electrodes 82, 84 may be electrically coupled with a controller 86 provided with a trigger 88. The controller 86 may be electrically coupled with a capacitor bank 90 capable of delivering a high-voltage instantaneous release of electric current across the electrodes.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of forming a refrigeration heat exchanger comprising a suction line and a capillary line, the method comprising:
   juxtaposing at least a portion of the suction and capillary lines to form a juxtaposed portion;
   at least partially enveloping the juxtaposed portion with a metal material; and
   encapsulating the capillary line to the suction line along at least a portion of the juxtaposed portion by moving the metal material at a speed great enough where at least a portion of the metal material flows plastically about the capillary line and the suction line;

wherein moving the metal material comprises applying a pulsed electromagnetic field to the metal material.

2. The method of claim 1 wherein the juxtaposed portion is completely enveloped with the metal material.

3. The method of claim 1 wherein the juxtaposing comprises abutting a portion of the suction and capillary lines.

4. The method of claim 1 wherein the at least partially enveloping comprises locating the juxtaposed portion within a sleeve of metal material.

5. The method of claim 1 wherein the at least partially enveloping comprises wrapping a ribbon of metal material about the juxtaposed portion.

6. The method of claim 1 wherein at least one of the suction and capillary lines is plastic.

7. The method of claim 6 wherein the other of the suction and capillary lines is plastic.

8. The method of claim 1 wherein the juxtaposing further comprises positioning at least a portion of the capillary line within a groove on the exterior of the suction line.

9. The method of claim 8 wherein the encapsulating further comprises conjoining at least a portion of the capillary line into the suction line along the groove.

10. The method of claim 9 wherein the conjoining comprises deforming a portion of the suction line.

11. The method of claim 1 wherein the juxtaposing comprises repeatedly juxtaposing portions of the suction and capillary lines.

12. The method of claim 11 wherein the repeatedly juxtaposing comprises sequentially juxtaposing portions of the suction and capillary lines.

13. The method of claim 12 wherein the sequentially juxtaposing comprises sequentially juxtaposing adjacent axial portions of the suction and capillary lines.

14. The method of claim 1 wherein at least one of the suction and capillary lines is metal.

15. The method of claim 14 wherein the other of the suction and capillary lines is metal.

16. The method of claim 15 wherein at least one of the suction and capillary lines is aluminum.

* * * * *